United States Patent [19]

Kondo

[11] 4,403,142
[45] Sep. 6, 1983

[54] MOVING OBJECT DETECTING APPARATUS

[75] Inventor: Mikio Kondo, Tsu, Japan

[73] Assignee: Matsushita Electric Works, Ltd., Osaka, Japan

[21] Appl. No.: 263,425

[22] Filed: May 14, 1981

[30] Foreign Application Priority Data

May 20, 1980 [JP] Japan ................................. 55-67507

[51] Int. Cl.³ ........................................... H01J 39/00
[52] U.S. Cl. ................................... 250/221; 340/555; 250/560
[58] Field of Search ............... 250/221, 222, 224, 560; 340/555, 556, 557; 356/28; 324/175

[56] References Cited

U.S. PATENT DOCUMENTS

| 2,595,993 | 5/1952 | Templeman et al. ............. 179/100.3 |
| 2,916,633 | 12/1959 | Stone et al. ........................... 250/560 |
| 3,474,252 | 10/1969 | Jacobson ............................... 250/216 |
| 3,679,906 | 7/1975 | Meyers ................................. 250/239 |
| 3,723,738 | 3/1973 | Brenner et al. ................ 250/83.3 H |
| 3,842,257 | 10/1974 | Köhler ................................. 250/206 |
| 3,875,403 | 4/1975 | Svensson ............................. 250/209 |
| 4,306,147 | 12/1981 | Fukuyama et al. ................. 250/221 |

Primary Examiner—David C. Nelms
Assistant Examiner—J. Jon Brophy
Attorney, Agent, or Firm—Burns, Doane, Swecker & Mathis

[57] ABSTRACT

A moving object detecting apparatus of which a plurality of light receiving means arranged to have a common light receiving zone and a plurality of independent light receiving zones are disposed within a single casing together with a light emitting means. Receiving order in the respective light receiving means of reflected light from a moving object within the zones is detected to discriminate moving direction of the object and desired indications are performed responsive to the discriminated direction.

10 Claims, 30 Drawing Figures

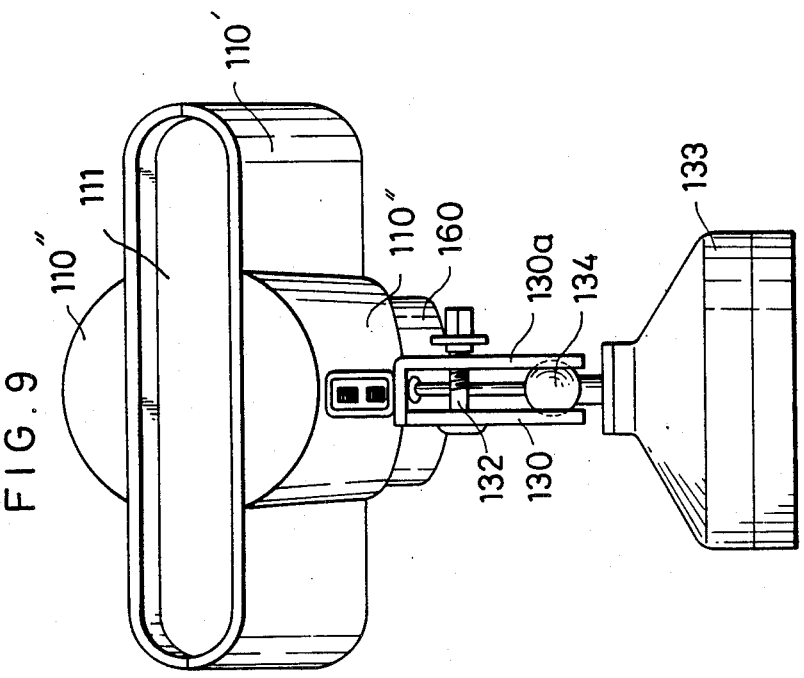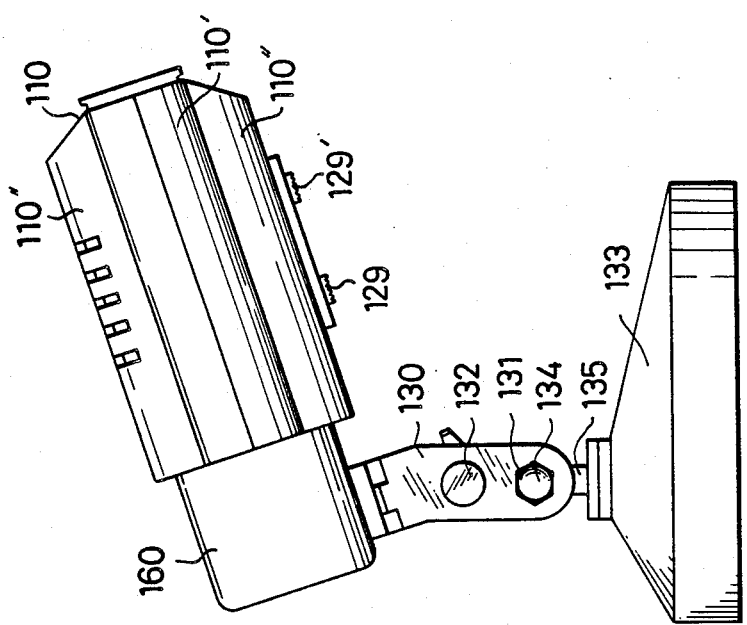

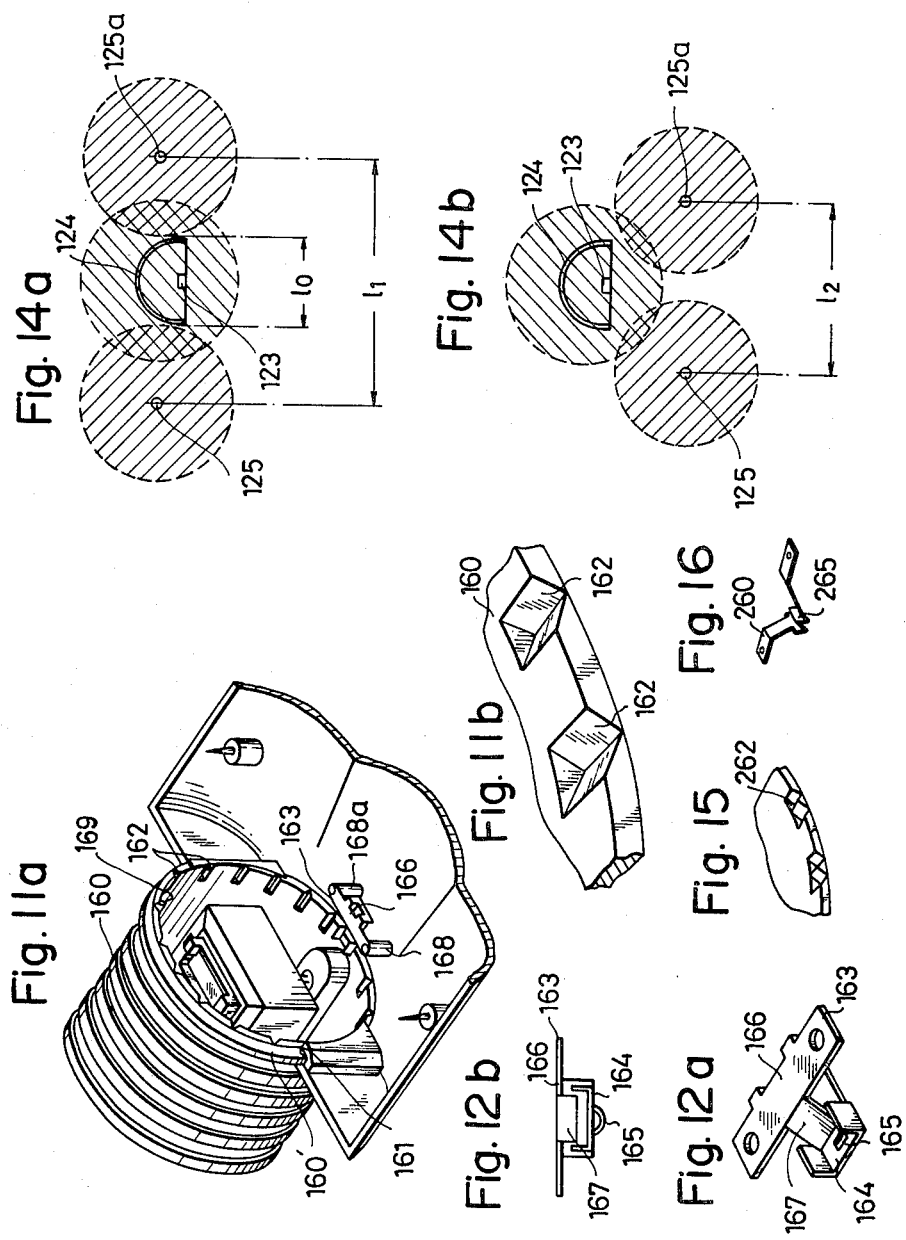

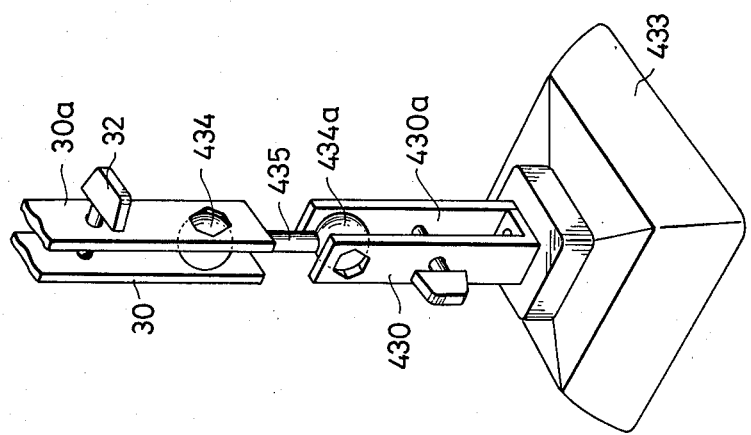
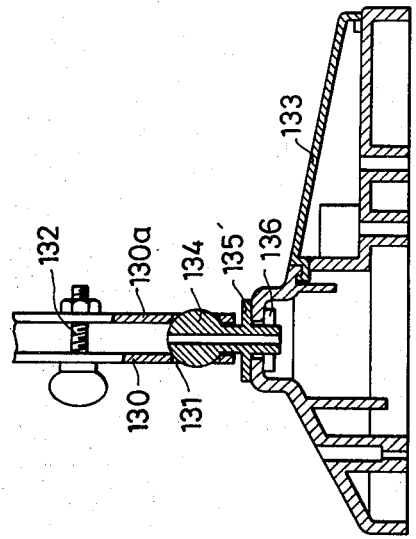
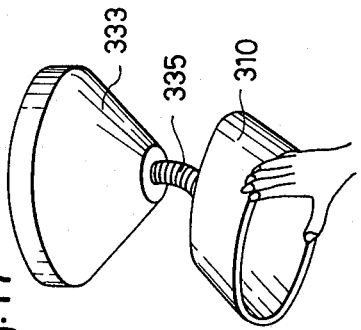

MOVING OBJECT DETECTING APPARATUS

This invention relates to apparatuses for detecting movements of an object and, more particularly, to a moving object detecting apparatus for discriminating, detecting and indicating moving directions of the object with a compact arrangement.

The moving object detecting apparatus of the kind referred to is provided with a light emitting element which emits a modulated light and with a light receiving element which receives the light reflected from the object so as to detect the object passing through a detecting zone of the light. However, this formation can not discriminate any moving direction in which the object passes through the detecting zone and has been likely to operate even when such a small creature as an insect comes flying by. Further, even if a normally stationary object slightly vibrates within the detecting zone, the light amount which the light receiving element receives will vary and the apparatus will operate. Thus the object to be detected could not be correctly detected.

On the other hand, there is also suggested an arrangement wherein a pair of detecting zones are formed by a modulated light so as to be adjacent to each other by providing the light emitting and receiving elements adjacent to one another and the moving object passing through the respective detecting zones is detected in turn to thereby discriminate the moving direction of the object. However, in this known arrangement, at least the light emitting and receiving means and their accessories must be prepared in a pair and the detecting zones must be respectively separately set, whereby manufacturing costs have been made high and mounting works of the respective elements have been complicated.

The present invention has been suggested to provide a moving object detecting apparatus wherein the foregoing defects are solved.

A primary object of the present invention is, therefore, to provide a moving object detecting apparatus wherein the moving direction of an object to be detected can be discriminated and a light emitting element and a pair of light receiving elements are contained in a single casing so as to attain the expected object and to thereby render the arrangement satisfactorily compact.

Another object of the present invention is to provide a moving object detecting apparatus wherein only a single casing containing a light emitting element and a pair of light receiving elements can be properly set, the mounting work is simple and the direction of the detecting zone is easy to set.

Still another object of the present invention is to provide a moving object detecting apparatus which will not operate in response to an entry of any other object than the object practically desired to be detected or to vibrations of any stationary object within the detecting zone.

A further object of the present invention is to provide a moving object detecting apparatus which can be made small enough.

Other objects and advantages of the present invention will become apparent from the following descriptions of preferred embodiments of the invention detailed with reference to accompanying drawings, in which.

Figure 3:
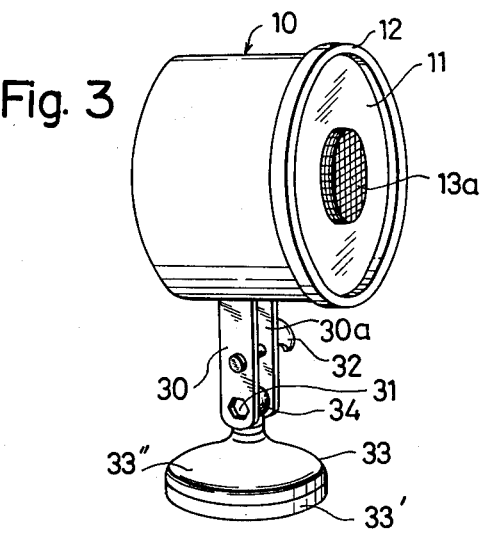
FIG. 3 is a perspective view showing the entire appearance of an embodiment of the moving object detecting apparatus according to the present invention.
Figure 4A:
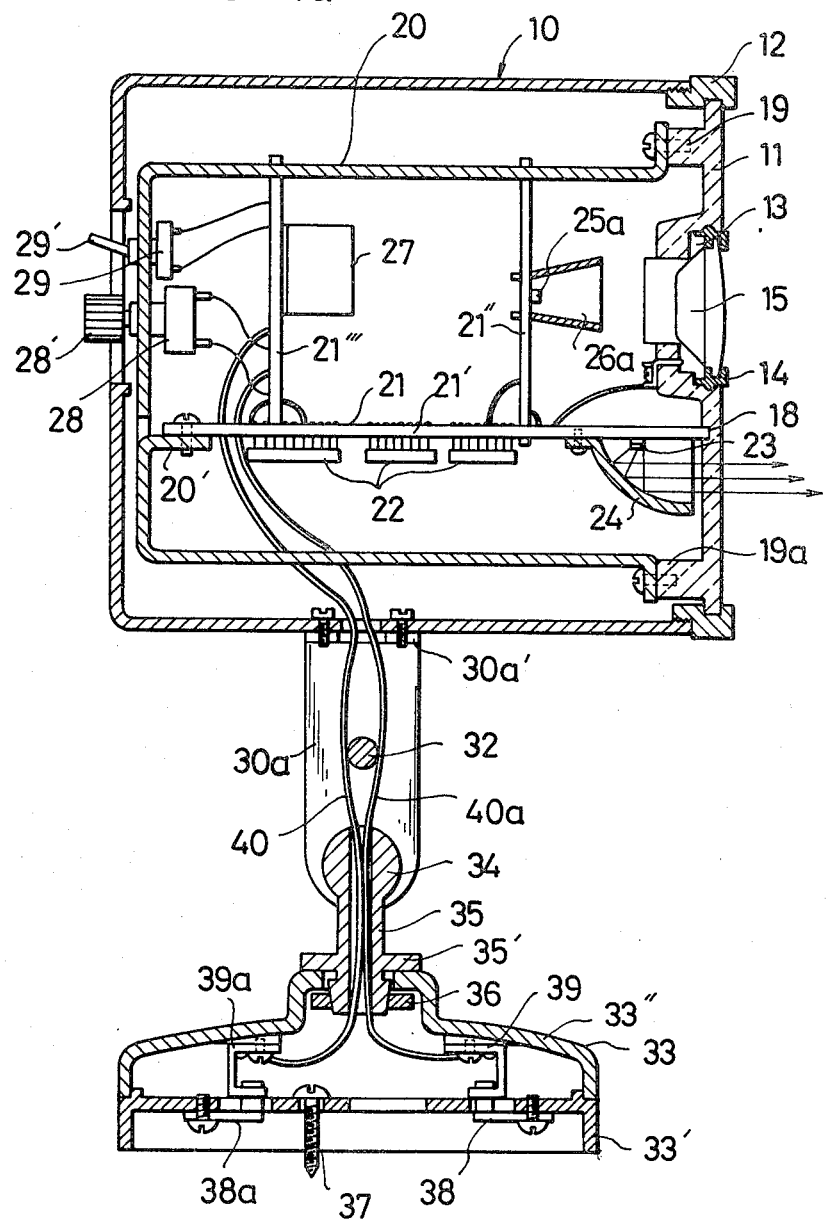
Figure 4B:
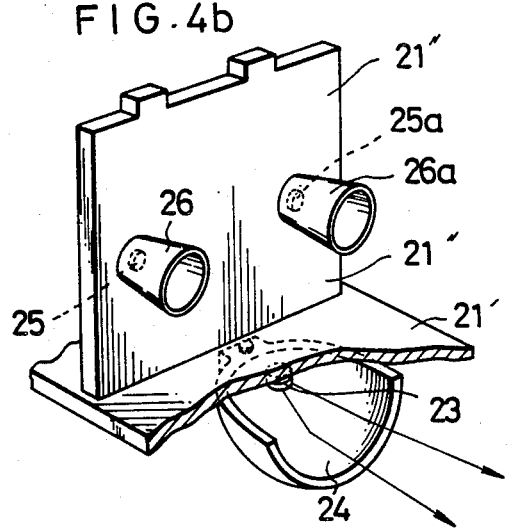
Figure 4C:
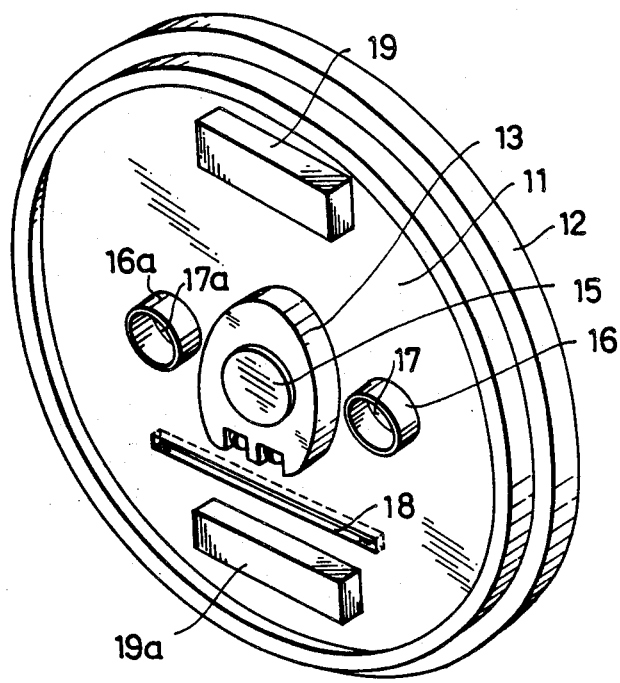
Figure 5:
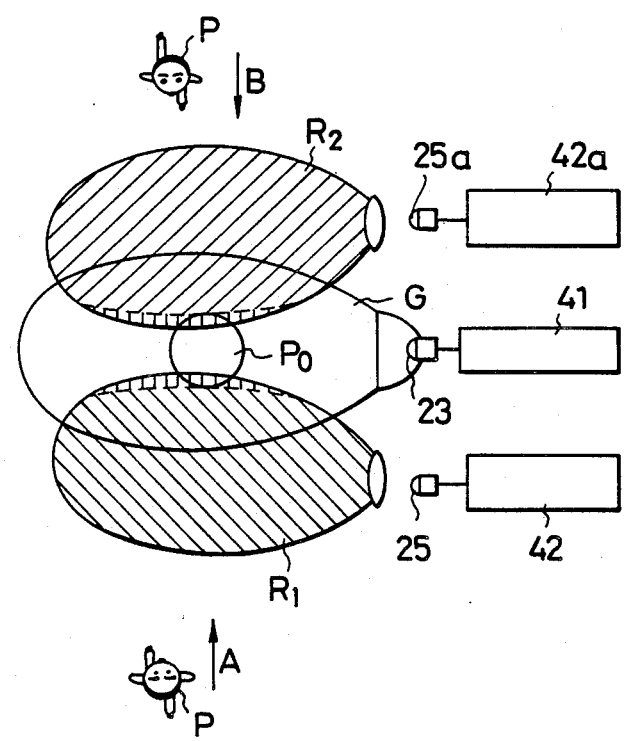
Figure 6:
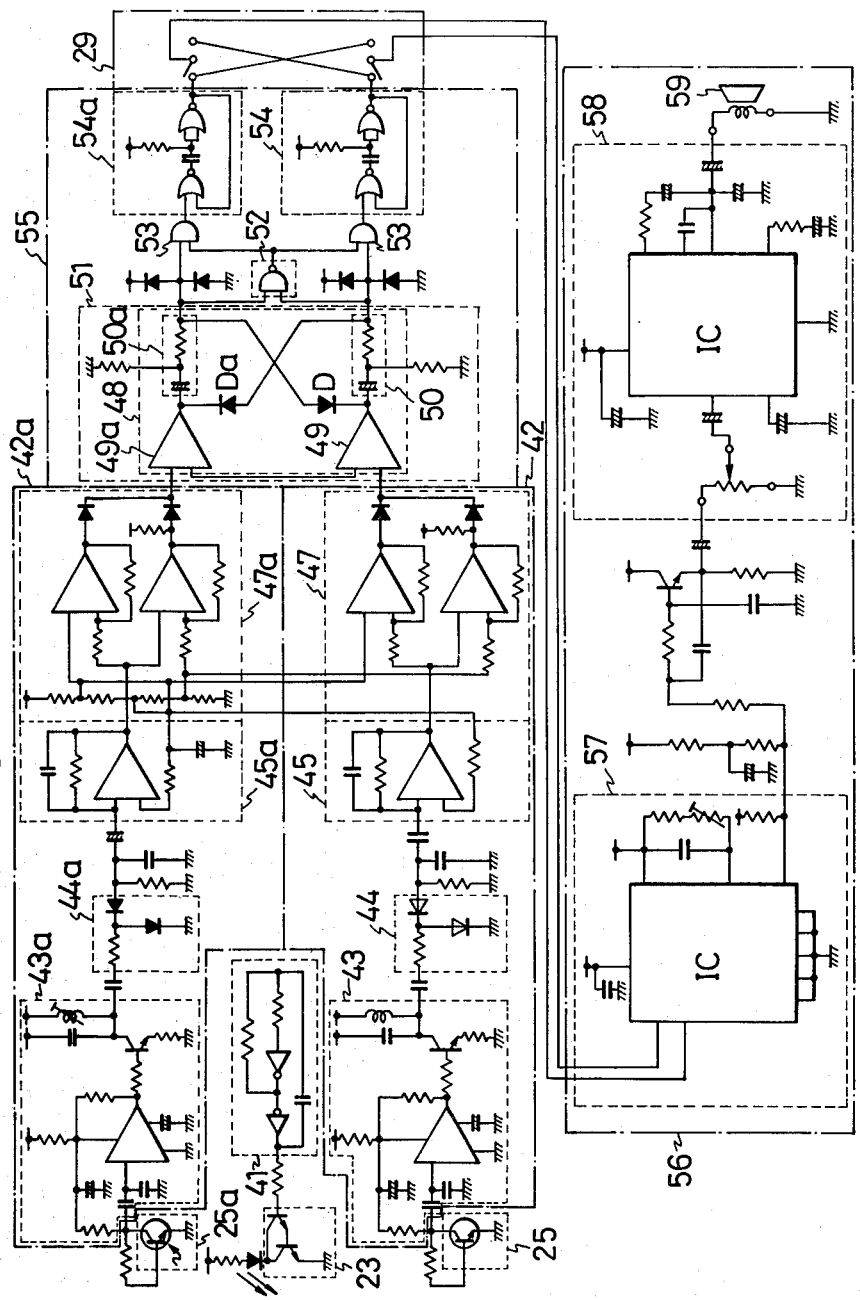
Figure 7:
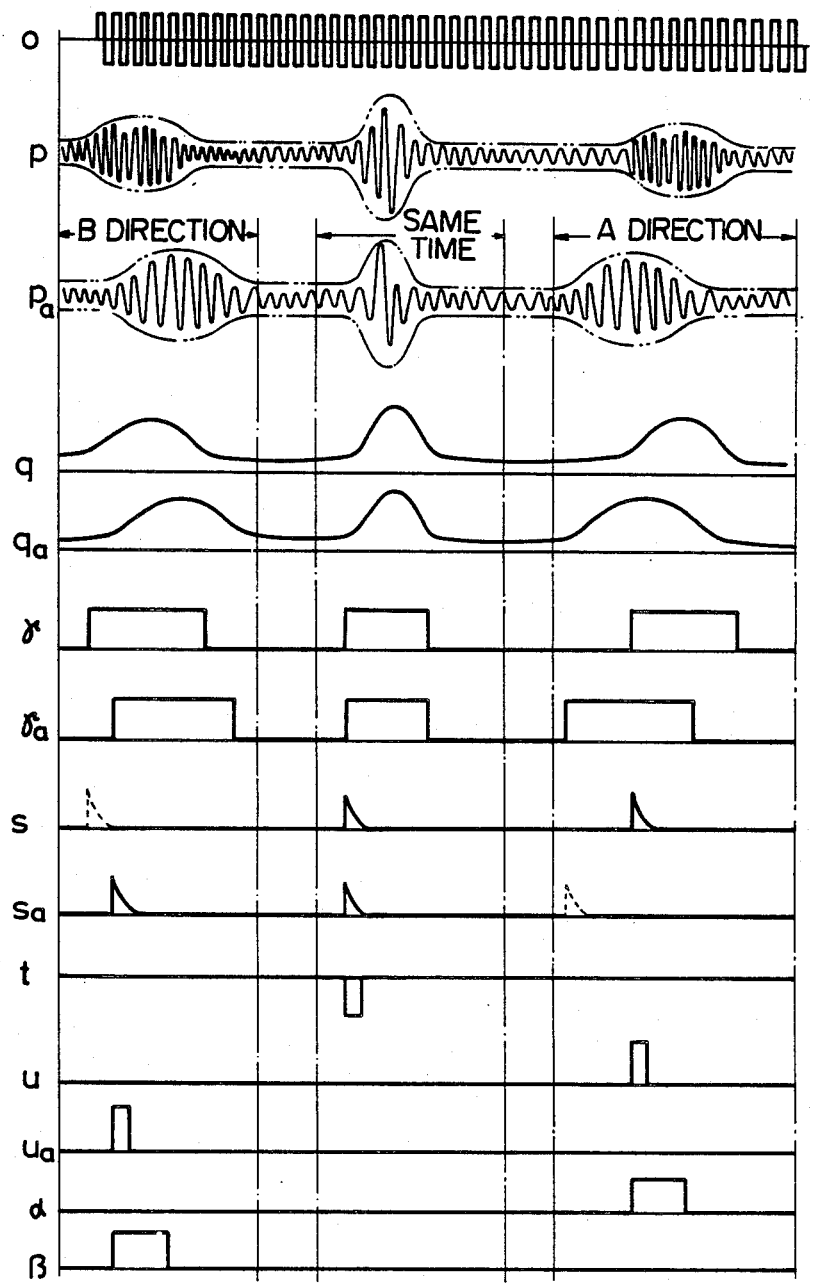
Figure 10A:
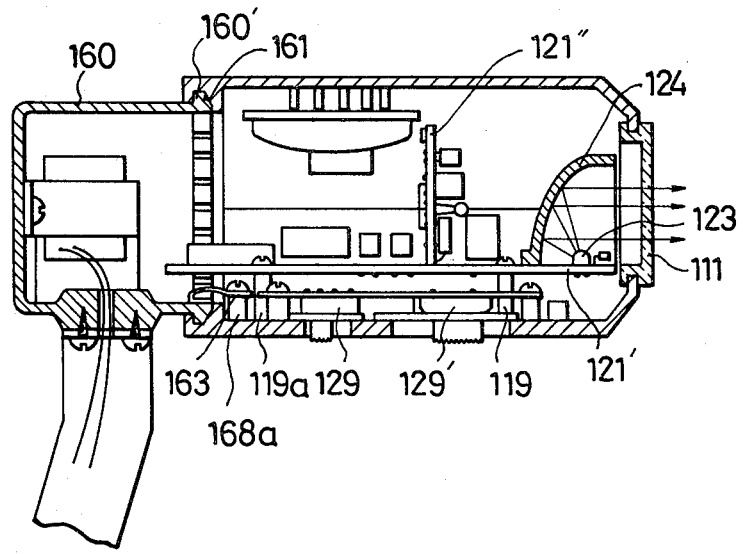
Figure 10B:
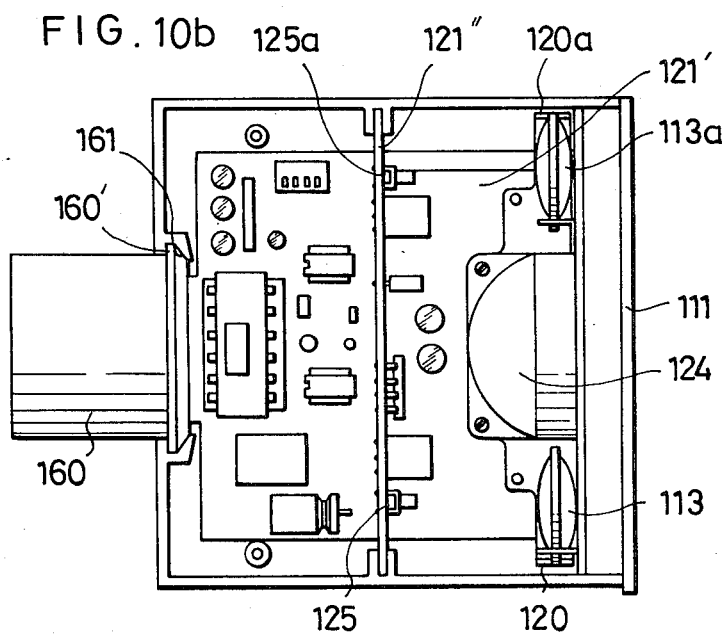
Figure 10C:
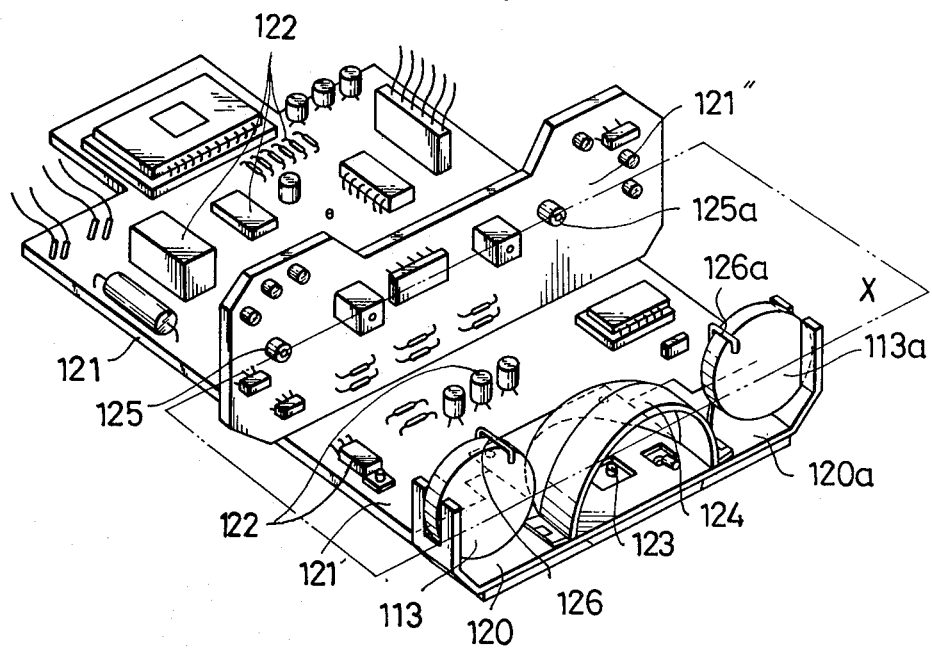
Figure 10D:
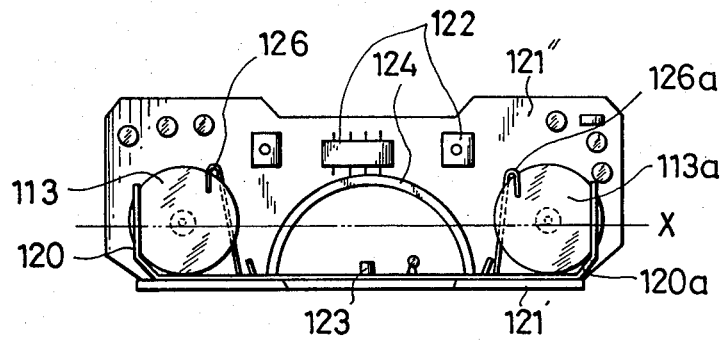

FIG. 4a is a vertically sectioned view as magnified of the apparatus shown in FIG. 3 shown with a metal screen on the front surface of the casing removed, FIG. 4b is a fragmental perspective view as magnified of the apparatus of FIG. 2 for showing positional relation between light emitting means and light receiving means therein, FIG. 4c is a perspective view as seen from the back of a front surface plate mounted to the front surface of the casing of the apparatus of FIG. 3;

FIG. 5 is an explanatory view showing an aspect of the detecting zone achieved by the apparatus shown in FIG. 3;

FIG. 6 is a circuit diagram showing an example a processing circuit operating when reflected light is received by the light receiving means shown in FIG. 5;

FIG. 7 is a set of diagrams showing wave form at respective parts of the processing circuit shown in FIG. 6;

FIG. 8 is a side view showing the entire appearance of another embodiment of the moving object detecting apparatus according to the present invention;

FIG. 9 is a front view of the apparatus shown in FIG. 8;

FIG. 10a is a fragmentary vertically sectioned view at a casing of the apparatus shown in FIG. 8, FIG. 10b is a plan view showing the interior arrangement of the casing, FIG. 10c is a perspective view of an assembly of light emitting element, light receiving elements, processing circuit elements and printed circuit board mounting the foregoings thereon and housed in the casing of FIG. 10a or 10b, and FIG. 10d is a front elevation of the assembly shown in FIG. 10c;

FIG. 11a is a fragmentary perspective view showing a coupling arrangement of the casing shown in FIG. 8 to its bearing cylinder, and FIG. 11b is a fragmentary perspective view as magnified of the bearing cylinder shown in FIG. 11a;

FIG. 12a is a perspective view as magnified of a means for locking the bearing cylinder shown in FIG. 8, and FIG. 12b is an elevation of the locking means;

FIG. 13 is a fragmentary vertically sectioned view at a supporting base of the apparatus shown in FIG. 8, including connecting legs of the base to the bearing cylinder, in a state where the connecting legs are rotated by 90 degrees from the state of FIG. 8;

FIGS. 14a and 14b are diagrams showing relations between a light emitting zone by means of the light emitting element and light receiving zones by means of the light receiving elements;

FIG. 15 is a fragmentary perspective view of another embodiment of the bearing cylinder;

FIG. 16 is a schematic perspective view of another embodiment of the means for locking the bearing cylinder;

FIG. 17 is a schematic perspective view showing another embodiment of the supporting base; and FIG. 18 is a perspective view of still another embodiment of the supporting base.

While the present invention shall now be detailed with reference to the preferred embodiments shown in the drawings, the intention is not to limit the invention to the particular embodiments but is to rather include all modifications, alterations and equivalent arrangements possible within the scope of appended claims.

Figure 1:
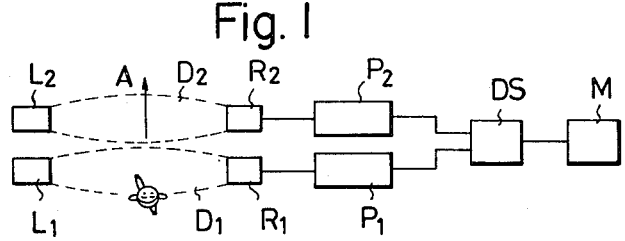
FIG. 1 is a block diagram showing relations between light emitting elements and light receiving elements in an exemplary known moving object detecting apparatus and its processing circuit.
Figure 2A:
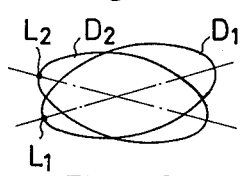
FIGS. 2a to 2d are explanatory views showing respective aspects of detecting zones achieved by the known apparatus shown in FIG. 1.
Figure 2B:
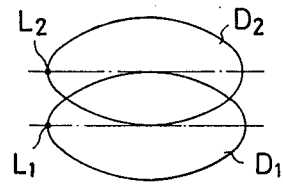
Figure 2C:
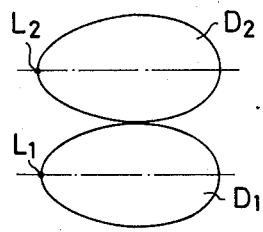
Figure 2D:
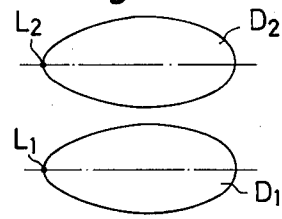

Referring first to the known moving object sensing apparatus shown in FIG. 1, a set of light emitting elements $L_1$ and $L_2$ and a set of light receiving elements $R_1$ and $R_2$ are provided in parallel so that, in the case when such an object as a human passing through detecting zones $D_1$ and $D_2$ moves, for example, in the direction indicated by an arrow A, first the amount of light being received at the light receiving element $R_1$ will vary and then the amount of light being received at the other light receiving element $R_2$ will vary. Therefore, when respective outputs from these light receiving elements $R_1$ and $R_2$ are provided to and processed at signal processing circuits $P_1$ and $P_2$ respectively comprising amplifying, detector, variation detector and level discriminating circuits, the processed outputs are then sent to an indicating circuit M through a moving direction sensing circuit DS including a circuit for storing input orders in the light receiving elements and a logical circuit, and a desired indication can be achieved by this indicating circuit.

At this time, such detecting zones $D_1$ and $D_2$ as in FIGS. 2a to 2d are supposed to be provided depending on relative setting positions of the pairs of the light emitting and receiving elements $L_1$, $R_1$ and $L_2$, $R_2$ and their light emitting and receiving direction. Particularly, in the case where the apparatus has the detecting zones of FIGS. 2a and 2d, it is necessary that, for example, the positions of the light emitting and receiving elements be determined with sufficiently high precision. In this arrangement wherein at least the pairs of the light emitting and receiving elements are separately set, there have been problems that, as has been well known, the mounting work is complicated, the number of parts is large to render the structure complicated and manufacturing costs are eventually made high.

According to a feature of the present invention, the light emitting means is a single element, a pair of light receiving means are provided with respect to such single light emitting means, the pair of the light receiving means are so arranged as to have a common light receiving zone from which, when the object to be detected is larger than a predetermined size, the respective light receiving elements will be able to simultaneously receive light and a pair of independent light receiving zones from each of which the respective light receiving elements can separately receive light on both sides of the common light receiving zone, and the single light emitting means and the pair of the light receiving means are fitted in a single casing.

Referring now to FIGS. 3 and 4a to 4c, the moving object detecting apparatus in a first embodiment of the present invention is provided with a bottomed cylindrical casing 10, and a ring frame 12 by which a disk-shaped front surface plate 11 is screwed to the peripheral edge at the opened end of the casing 10. The front surface plate 11 itself is formed preferably of a transparent synthetic resin. A speaker-housing chamber 13 opened on the front surface and covered with a metal screen 13a from the outer surface is provided in the center of the front surface plate 11. A speaker 15 is housed in this chamber 13 through a proper holding member. Small cylindrical lens-housing chambers 16 and 16a opened at both axial ends are formed in symmetrical positions as aligned in the horizontal direction on both sides of the speaker-housing chamber 13 on the front surface plate 11. Lenses 17 and 17a respectively forming a part of each light receiving means are fitted respectively in the lens-housing chambers 16 and 16a. Further, a recess 18 for holding a later detailed printed circuit board is formed below the speaker-housing chamber 13 on the back surface of the front surface plate 11 and fitting bases 19 and 19a are provided on both sides of the speaker-housing chamber 13 to project rearward from the plate 11 at symmetrical positions opposing in the vertical direction.

A supporting frame 20 is housed within the casing 10 and extended skirts of respective leg ends of the supporting frame 20 are secured to the fitting bases 19 and 19a with screws. Further, a printed circuit board 21 similarly housed in the casing 10 comprises, in the present case, a horizontal part 21' and front and rear vertical parts 21'' and 21''' spaced parallelly from each other. The horizontal part 21' is secured at the front end in the recess 18 of the plate 11 and at the rear end to a tongue piece 20' cut and raised from the supporting frame 20 as fastened thereto by a screw. Circuit parts 22 of a later described processing circuit are properly incorporated in the entire printed board 21. A light emitting element 23 which forms a main part of the light emitting means is fitted to the front lower surface of the horizontal part 21' so as to emit light downward. A reflector 24 of a semiparabolic shape in section is fixed at its upper end onto the front lower surface of the horizontal part 21' adjacent the light emitting element 23 so that a modulated light emitted out of the element 23 will be reflected by the reflector 24 to pass through the transparent front surface plate 11 so as to be irradiated in front of the casing 10 as a flux of light.

Figure 4D:
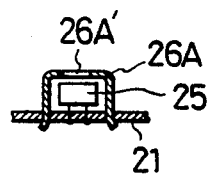

On the other hand, light receiving elements 25 and 25a forming a main part of the light receiving means are incorporated in the focus positions of the lenses 17 and 17a fitted to the front surface plate 11 on the front surface of the front vertical part 21'', and conical or trapezoid hoods 26 and 26a preventing external light from being received are secured so as to position the light receiving elements 25 and 25a in the respective centers. In such case, a small circular hole 26A' may be made on the front surface of each small chamber 26A fitting therein the light receiving element, in place of the hoods 26 and 26a, as shown in FIG. 4d. Further, a terminal of the speaker 15 fitted, for example, to the front surface plate 11 is connected to the horizontal part 21' and, for example, a capacitor 27 is fixed to the rear vertical part 21'''. Further, a speaker volume controller 28 and a change-over switch 29 are mounted to the supporting frame 20 behind the rear vertical part 21'''. The knob 28' and operating lever 29' are exposed out of an opening on an end surface of the casing 10. The change-over switch 29 can be used, for example, for switching over the light receiving order of the light receiving elements 25 and 25a of the light receiving means as will be described later.

According to another feature of the present invention, the casing is connected to the supporting base in such manner that the front surface plate through which the modulated light is emitted and received can be directed in any optional direction. Referring again to FIGS. 3 and 4a, base parts 30a' of a pair of connecting legs 30 and 30a provided parallelly as slightly separated from each other (only one of which is shown in FIG. 4a) are secured to the lower part of the casing 10 with screws. Hexagonal holding holes 31 (only one of which is illustrated in FIG. 3) axially aligned with each other in the horizontal direction are made respectively in the connecting legs 30 and 30a, the latter of which is connected with each other through a fastening screw 32 making both legs separable from each other. Further, a supporting base 33 is provided securably to a wall surface or the like by any known measure and a fixing leg 35 having a spherical connecting part 34 at the tip and having a through hole is fixed as directed upward. The fixing leg 35 has its horizontal flange part 35' brought into contact with the upper surface of the supporting base 33 and is fixed by fastening a nut 36 screwed to the lower end of the fixing leg 35 within the supporting base 33. The spherical connecting part 34 of the fixing leg 35 is partly engaged in the hexagonal holding holes of the connecting legs 30 and 30a to function as a so-called universal joint with the adjustment of the fastening screw 32.

On the other hand, the supporting base 33 itself comprises a base seat part 33' to be secured directly to the wall surface or the like by screws 37 and a cover part 33" to be covered with the base seat part. Blade receiving springs 38 and 38a to be properly connected to an external current source are secured to the base seat part 33' with screws. Catching plug blades 39 and 39' engaged respectively with the blade receiving springs 38 and 38b by rotating the cover part 33" are fixed to the base seat part 33'. The connection of the cover part 33" with the base seat part 33' is also achieved by the engagement of the catching plug blades 39 and 39a respectively with these blade receiving springs 38 and 38a. Further, connecting wires 40 and 40a connected respectively to the catching plug blades 39a and 39 are passed through the fixing leg 35 from the cover part 33" as extended between the connecting legs 30 and 30a and through the lower opening of the casing 10 to be connected to the printed circuit board 21 and can be fed with a current from the external current source.

Referring to FIGS. 5 to 7, the operation of the above described embodiment shall be explained. The cover part 33" is fitted to the base seat part 33', the printed circuit board 21 is fed with an electric current and the connecting legs 30 and 30a are displaced with respect to the fixing leg 35 by adjusting the fastening screw 32 to direct the front surface plate 11 of the casing 10 in any desired direction. In this case, the respective light emitting and light receiving means are arranged as so adjusted as to properly emit and receive light and, as particularly shown in FIG. 5, a light emitting circuit 41 is driven so that modulated light will be projected out of the light emitting element 23 and light receiving zones $R_1$ and $R_2$ of the light receiving means having the lenses, and light receiving elements 17, 25 and 17a, 25a will be formed on both sides of the light emitting zone G.

Now, when a predetermined object P to be detected passes toward the light emitting zone G and light receiving zones $R_1$ and $R_2$ in the direction indicated by the arrow A, such modulated light as shown by "o" in FIG. 7 projected out of the light emitting element 23 will be received by the light receiving element 25 and then by the other element 25a in the order mentioned and output signals from the light receiving means will be provided to light receiving signal processing circuits 42 and 42a. Detailed arrangement of the light receiving signal processing circuits 42 and 42a are shown in FIG. 6. The output signals from the light receiving means are first amplified respectively by amplifying circuits 43 and 43a which are tuned to the frequency of the light from the light emitting element so as to be respectively of such wave forms as shown by "p" and "$p_a$" in FIG. 7, which are provided to detector circuits 44 and 44a, low-pass filters 45 and 45a and low-pass amplifiers 46 and 46a, through which such wave forms as shown by "q" and "$q_a$." These wave forms are then shaped respectively in wave-form shaping circuits 47 and 47a to generate such output voltages as of "$\gamma$" and "$\gamma_a$" in FIG. 7. The outputs of these wave-form shaping circuits 47 and 47a are sent to a differential type phase detecting circuit 48, which itself includes a first cancelling circuit 51 comprising comparators 49 and 49a for comparing, for example, the output voltages $\gamma$ and $\gamma_a$ with a reference voltage $v_{ref}$, differentiators 50 and 50a and diodes D and Da respectively having the anode connected to an output terminal of the differentiators 50 and 50a and the cathode connected to an output terminal of the comparators 49 and 49a. Such outputs as shown by "s" and "$s_a$" in FIG. 7 from the phase detecting circuit 48 are sent to a same-phase detecting circuit 52 comprising a NAND gate which generates such output as shown by "t" in FIG. 7 and AND gates 53 and 53a, and these NAND gate and AND gates are forming a second cancelling circuit.

On the other hand, such outputs as shown by "u" and "$u_a$" in FIG. 7 from the AND gates 53 and 53a are provided into monostable multi-circuits 54 and 54a to pass therethrough. In other words, such an output signal as shown by "$\alpha$" or "$\beta$" in FIG. 7 from a moving direction discriminating circuit 55 comprising the respective circuits from the phase detecting circuit 48 to the monostable multi-circuits 54 and 54a are provided to an indicating circuit 56 in the final step through the foregoing change-over switch circuit 29. The indicating circuit 56 itself comprises, for example, a combined voice generating circuit 57, an amplifier 58 connected to the voice generating circuit through a filter circuit and a speaker 59.

More particularly, the light receiving zones achieved by a pair of the light receiving means will receive light simultaneously only when the object to be detected is larger than a predetermined size as described above. That is, as will be evident when FIG. 5 is referred to an object Po to be detected is set so that it can be positioned over both light receiving zones. Therefore, even if an object smaller than the predetermined size passes through the both detecting zones, the output of one of the comparators of the moving direction discriminating circuit 55 corresponding to one of the light receiving zones in which this object is located will be on a high level but the output of the other comparator of the circuit will be still on a low level, and a differentiated pulse generated by one of differentiators in the later step of the comparator will be made to be on a lower level by one of the diodes forming the first cancelling circuit and will not be provided out of one of the AND gates of the second cancelling circuit.

When, on the other hand, an object of the predetermined size passes through the detecting zone, the output of one of the comparators which corresponds to one of the detecting zones will be on a high level and, at the same time, when the object moves to a position occupying the both detecting zones, the output of the other comparator corresponding to the other detecting zone will be also on a high level and the moving direction discriminating circuit will be driven without being influenced by the diode of the first cancelling circuit. When, for example, the object proceeds in the direction indicated by the arrow A, the signal α will be provided out of the discriminating circuit and, when it proceeds in the direction indicated by the arrow B, the signal β will be provided. The combined voice generating circuit will be driven in response to these output signals, whereby such a voice as "welcome!" may be generated out of the speaker 59 for the movement of the object in the direction indicated by the arrow A whereas such a voice as "Thank you!" may be generated out of the speaker 59 for the movement of the object in the direction of the arrow B.

On the other hand, when an object vibrates in the detecting zone, the amounts of the received light in both light receiving means vary simultaneously, so that outputs will be provided simultaneously out of the both comparators and will pass through the first cancelling circuit but there will be no output from the second cancelling circuit comprising the NAND gate and the pair of AND gates and the indicating circuit will not operate.

Incidentally, the indicating circuit 56 can be used in the manner reverse to the above description by reversing the change-over switch circuit 29 by the switching operation of the operating lever.

Further, according to a remarkable feature of the present invention, the casing can be made flat or small by an arrangement wherein the center of the flux of light irradiated out of the light emitting means arranged within the casing and the center of the flux of light received by the light receiving means are positioned in the same place. Now, referring to FIGS. 8 to 13 showing another embodiment of the present invention, a casing 110 made by combining two divided halves is formed to be of a contour in which semicircular swollen parts 110" are made integral above and below the middle of a body part 110' which is elliptic as seen from the front. A printed circuit board 121 having a horizontal part 121' and vertical part 121" is fitted within the casing 110. The horizontal part 121' of the board 121 is secured by screws to fitting base parts 119 and 119a provided as erected on the lower inner surface of the casing 110. In contrast to the foregoing embodiment of FIGS. 3 and 4, a light emitting element 123 and reflector 124 are incorporated on the upper surface of the front part of the horizontal part 121'. Lenses 113 and 113a are embraced and held respectively by supporting pieces 120 and 120a secured to both front corners of the printed circuit board 121 on both sides of the reflector 124. Light receiving elements 125 and 125a of light receiving means are incorporated in the vertical parts 121" so as to be positioned respectively in the focus positions of the lenses 113 and 113a. Further, in this case, the light emitting element 123, reflector 124, lenses 113 and 113a and light receiving elements 125 and 125a are so arranged that the center of the flux of light emitted out of the light emitting means and the center of the flux of light received by the light receiving means will be in the same plane X. Further, the lenses 113 and 113a can be positively held by locking each one end of wire springs 126 and 126a which are locked at the other end to the supporting pieces 120 and 120a. It should be appreciated that, similar to the embodiment of FIGS. 3 to 4, circuit parts 122 forming the circuit of FIG. 6 are incorporated in the printed circuit board 121.

On the other hand, a transparent front surface plate 111 is fitted to the front surface of the casing 110 and annular grooves 161 for receiving a flange 160' in the front end part of a support cylinder 160 are formed in the middle of the rear end edge of the casing. Substantially V-cut grooves 162 slightly extending in the axial direction of the cylinder are formed as spaced in the peripheral direction in the inner peripheral wall of the front end part of the cylinder 160. A locking piece 163 secured by a screw to the inner surface of the lower part of the casing 110 can be locked in this V-cut groove 162. The locking piece 163 itself is formed by bending a resilient metal plate and a projection 165 which can be engaged in the groove 162 is extruded and shaped on the lower surface of a base part 164 to be U-shaped as viewed from the front. A horizontal part 166 is extended as bent to be U-shaped as seen from the side integrally with the base part 164, and a tongue part 167 extending diagonally downward from the middle of the horizontal part 166 so as to be positioned slightly above the base part 164 is provided.

If the horizontal part 166 of this locking piece 163 is secured at both ends with screws to fitting pillars 168 and 168a erected in the lower part of the casing and the projection 165 is engaged into the V-cut groove 162 of the supporting cylinder 160, the latter can be axially rotatably fixed to the casing 110. In this case, the locking piece 163 is sufficiently resilient so that, when the casing 110 is to be rotated with respect to the cylinder 160, the casing 110 can be selectively positioned as stepwise slid smoothly over respective intervals between the respective grooves 162 and can be fixed at the selected position. The base part 164 will be prevented by the tongue part 167 from springing up excessively when the casing 110 is rotated and its smooth rotation will be always guaranteed. In order to prevent any twisting of the current feeding wire passed through the casing 110 from the supporting cylinder 160, it is preferable that a stopper 169 which engages with erected edge of the base part 164 is provided to project in the radial direction on the inner surface of the front end part of the supporting cylinder 160, so as to control rotating angle of the casing 110 to be of a fixed value. Further, such circuit part as a change-over switch 129, ON-OFF switch 129' or the like which is similar to the change-over switch in the case of FIGS. 3 and 4 is provided on the lower surface of the casing 110 and a proper circuit part can be arranged also within the supporting cylinder 160.

In the above, the formation of the so-called universal joint comprising the connecting legs connected to the supporting cylinder 160 and fixing legs fixed to the support base and connected to the connecting legs is substantially the same as that in the foregoing embodiment of FIGS. 3 and 4, except that the connecting legs in the present embodiment are formed to be slightly bent as seen from the side. Therefore, the same members as those shown in the embodiment of FIGS. 3 and 4 are shown in FIGS. 8 to 13 of the present embodiment with reference numerals made by adding 100 to their reference numerals.

Further, in the present embodiment, specifically, the center of the received flux of light is positioned in substantially the same plane X as of the center of the projected flux of light as will be clear in view of FIG. 14a, to that the distance $l_1$ between the respective light receiving elements 125 and 125a, that is, between the both received fluxes of light will be much larger than the distance $l_2$ in the formation in which, as in FIG. 14b, the projected flux of light and received flux of light are not in the same plane, the distance $l_0$ between the both light receiving zones will become large enough and, therefore, only when an object larger than the predetermined size passes, the apparatus will be able to be positively operated. Other formations, operations and functions are the same as those in the embodiment of FIGS. 3 and 4.

In the above, even if the V-cut grooves are respectively formed in twin on the inner peripheral surface of the front end part of the supporting cylinder as shown by 262 in FIG. 15 and a locking piece 260 is formed of a spring plate having twin projections 265 as shown in FIG. 16 for engaging with the twin V-cut grooves 262, the same function can be obtained.

In addition, as shown in FIG. 17, a casing 310 and support base 333 can be connected with each other through a flexible connecting tube 335. On the other hand, as shown in FIG. 18, connecting legs 430 and 430a of the same formations as those in FIGS. 3 and 4 are fixed to a support base 433, and spherical connecting parts 434 and 434a at both ends of a connecting rod 435 are connected with these two sets of the connecting legs in the same manner as in the case of FIGS. 3 and 4, the casing and support base can be connected with each other through a so-called two-point universal joint.

According to the present invention arranged as has been described above, the number of required parts is reduced, the respective light emitting and light receiving means which can detect the moving direction of the object to be detected are housed in the single casing so that the arrangement can be made compact and the detecting zone can be easily set. Further, even if a pair of light receiving means are housed in the single casing, a common light receiving zone may be obtained while the distance between the light receiving zones can be taken to be so large that the moving direction of the object can be correctly detected and, at the same time, the apparatus can be made operable only with the object larger than a predetermined size. Further, the apparatus can be effectively minimized in size and high in multipurpose utility.

What is claimed is:

1. A moving object detecting apparatus for detecting variations in the amount of received light corresponding to movements of an object larger than a predetermined size to be detected and for discriminating and indicating the direction of movement of said object, said apparatus comprising a casing having a transparent plate fitted to the front surface of said casing, means including a light emitting element irradiating modulated light through said transparent plate, a plurality of light receiving means respectively including a light receiving element for receiving through said transparent plate irradiated modulated light reflected from said object within an independent light receiving zone that is exclusive of the light receiving zone of the other light receiving element, from which respective said receiving elements can separately receive the light when the object passes through a detecting zone defined by the receiving zones of said light receiving means together with the zone of irradiation of said light emitting means and simultaneously receive reflected light when the object is larger than said predetermined size, a circuit for processing a signal from respective said light receiving means for detecting the sequence of light received at the respective means, discriminating said direction of movement of the object and generating different signals in response to the direction of movement of the object, and means for making an indication in response to said different signals from said signal processing circuit.

2. A moving object detecting apparatus according to claim 1 wherein a pair of light receiving means are arranged mutually symmetrically with respect to the light emitting element, and the respective light emitting element and light receiving means are assembled to a printed circuit board arranged within said casing.

3. A moving object detecting apparatus according to claim 2 wherein said signal processing circuit comprises a pair of level discriminating circuits respectively for discriminating levels of said light received by each of said pair of light receiving means, a pair of differentiating circuits connected in series to each of said level discriminating circuits, a first cancelling circuit for transmitting output signals from said pair of level discriminating circuits when output signals are provided from both of said circuits and for erasing outputs of said differentiating circuits when there is no output from either one of the level discriminating circuits, and a second cancelling circuit for transmitting output signals from said pair of differentiating circuits when they are generated at different times and for erasing outputs of the differentiating circuits when they are simultaneously generated.

4. A moving object detecting apparatus according to claim 1 wherein said casing is provided to be supported by a supporting base, and a joint allowing the casing to perform at least swinging motions is interposed between the casing and said supporting base.

5. A moving object detecting apparatus according to claim 4 wherein said joint comprises a pair of connecting legs which are fixed to said casing and respectively having a polygonal holding hole, said legs being capable of being joined and separated to each other by means of a fastening screw, and a connecting member having a spherical connecting part held between the connecting legs in said holding holes.

6. A moving object detecting apparatus according to claim 4 wherein said joint is made of a flexible metal tube.

7. A moving object detecting apparatus according to claim 2 wherein respective said light emitting and light receiving means are arranged so that the center of emitted flux of light of the light emitting means and the centers of received fluxes of light of said pair of light receiving means are positioned substantially in the same plane.

8. A moving object detecting apparatus according to claim 2 wherein said light emitting means further comprises a reflector of a semiparabolic surface reflecting light irradiated out of said light emitting element, said light receiving means further comprises a lens arranged adjacent the front surface plate of said casing, and said light receiving element is arranged in the focus position of said lens.

9. A moving object detecting apparatus according to claim 2 wherein said printed circuit board is provided with a horizontal part and vertical part, said light emitting means is assembled to said horizontal part and said light receiving means are assembled to said vertical part.

10. A moving object detecting apparatus according to claim 4 wherein said casing is provided to be of a flat contour having semicircular swollen parts which are integral with the casing at positions above and below of the middle of a body part which is elliptic as seen from the front and a support cylinder rotatably fitted in the center of the rear end part of the casing is interposed between the casing and said joint.

* * * * *